United States Patent [19]

Kitagami et al.

[11] 4,047,206
[45] Sept. 6, 1977

[54] SINGLE LENS REFLEX CAMERA

[75] Inventors: Kazuo Kitagami, Tokyo; Katsuhiko Miyata, Tsurugashima; Akihiro Arai, Tokyo, all of Japan

[73] Assignee: Asahi Kogaku Kogyo Kabushiki Kaisha, Tokyo, Japan

[21] Appl. No.: 696,984

[22] Filed: June 17, 1976

[30] Foreign Application Priority Data

June 17, 1975 Japan .................................. 50-73437

[51] Int. Cl.² ............................................. G03B 19/12
[52] U.S. Cl. ....................................... 354/152; 354/150
[58] Field of Search ............... 354/152, 153, 154, 155, 354/156, 157, 158, 150, 151

[56] References Cited

U.S. PATENT DOCUMENTS

| 713,629 | 11/1902 | Garfield | 354/152 |
|---|---|---|---|
| 1,631,301 | 6/1927 | Washington | 354/158 |
| 2,200,007 | 5/1940 | Mihalyi | 354/152 X |
| 3,699,864 | 10/1972 | Shimomura | 354/152 X |

Primary Examiner—Edna M. O'Connor
Attorney, Agent, or Firm—Sughrue, Rothwell, Mion, Zinn and Macpeak

[57] ABSTRACT

A single lens reflex camera system includes multiple replaceable mirrors, each designed to accomplish a specified function for different conditions of photography.

4 Claims, 5 Drawing Figures

SINGLE LENS REFLEX CAMERA

BACKGROUND OF THE INVENTION

The present invention is in the field of single lens reflex cameras and in particular is directed to a single lens reflex camera with interchangeable mirror operation to best suit the particular photographing conditions.

It is well known to provide a single lens reflex camera with many features so systematized that it can allow a variety of photographies with the aid of various techniques. However, the single lens reflex cameras have not been developed to such a level as to perform perfect functions under special conditions. The portions of the single lens reflex camera which especially need further development include the finder optical system and the photometric optical system.

FIG. 1 shows an optical system of a conventional single lens reflex camera, comprising an interchageable lens system 1, a retractable reflecting mirror 2, film 3, focusing plate 4, pentagonal prism 5, and magnifying lens 6. Generally speaking, the locus of the leading end of a reflecting mirror, which is made to pivot, is restricted by the back focus of the photographing lens system. This restriction is due soley to the need to avoid having the mirror strike the lens as it swings from the prephotography position, shown in the drawing, to the photographing position, e.g. parallel to the focusing plate. The back focus is typically shorter for a wide angle lens (having a short focal length) and longer for a tele-photo lens (having a long focal length). To cope with the restriction, therefore, the reflecting firror is made sufficiently short so as to cope with the interchangeable lens system having the shortest focal length.

However the latter shortening of the mirror, to accomodate this shortest focal length lens system for which the camera is designed, results in the so-called "mirror shortage" phenomena. This phenomena is observed through the finder optical system, 4, 5 and 6 as a darkening of the leading edge 4a of the focusing plate, particularly when a large focal length lens system, such as a telephoto lens, is used. This is caused by the fact that the light which would normally reflect off the edge of the mirror, is not reflected by the shortened mirror.

Another feature of SLR retractable mirror, which feature becomes a problem in certain types of photography operations is the shock accompanying the retraction and restoration of the mirror from the optical path just prior to and just after the shutter open period. In certain situations the shock results in undesireable blur and noise. One known technique for overcoming the effect of the shock on picture taking is to provide a separately actuable mechanism for holding the mirror out of the optical path.

A translucent reflecting mirror will also prevent shock, and its effects, because such a mirror does not have to be moved. It remains in the optical path, reflecting a portion of the light to the finder system and passing a portion of the light to the film. Unfortunately, however, in most photography situations the translucent mirror is not suitable as it can produce a double or flared image, thus degrading the quality of the picture.

SUMMARY OF THE INVENTION

It is therefore an object of the present invention to provide a single lens reflex camera with an improved mirror system, capable of overcoming the above defects.

The object is achieved by providing a single lens reflex camera having a set of interchangeable mirrors which can be selectively used depending on the requirements of the particular photography conditons. The system includes replaceable short and long, totally reflecting mirrors for use with wide angle and telephoto lens systems respectively, and a translucent mirror for use where prevention of mirror shock is most important. Other mirrors to meet special conditions may also be included as a part of the camera system.

DETAILED DESCRIPTION

Figure 1:
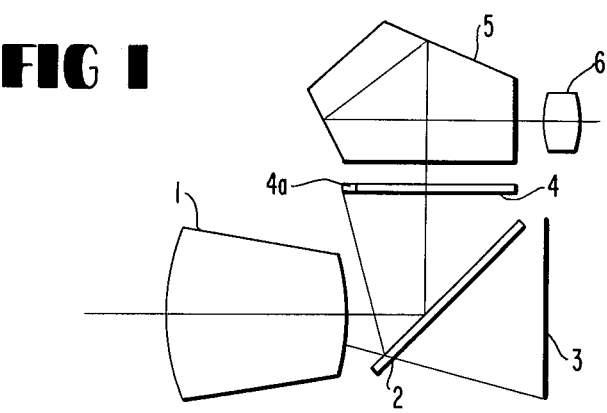
FIG. 1 illustrates a conventional arrangement of a single lens reflex camera system.
Figure 2:
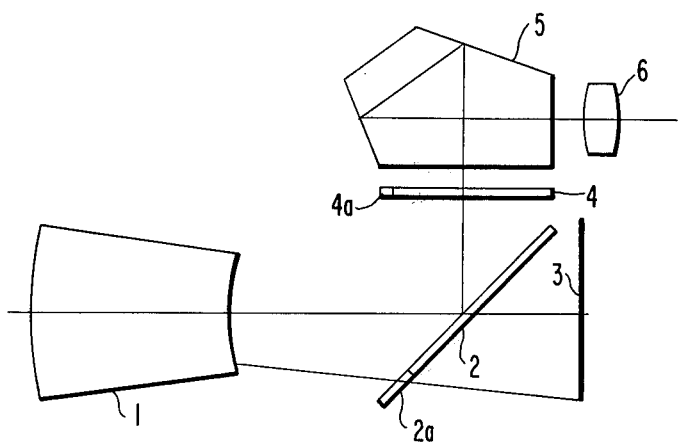
FIG. 2 illustrates the feature of mirror interchangeability in a single lens reflex system.

The above mentioned limitations on conventional SLR cameras can be overcome by providing a SLR camera system with interchangeable mirrors. Thus, while the standard mirror might be the same as that conventionally used in SLR cameras, i.e. the shortened one capable of use with the wide angle lens and shown in FIG. 1, a longer mirror can be used when the lens system is a telephoto lens system. Thus, as shown in FIG. 2, a mirror extending to 2a is substituted for the shortened mirror when a telephoto lens is used. When a wide angle lens is used, the shorter mirror may be put back in the camera.

Furthermore where the effects of shock due to mirror retraction and return may be unacceptable or undesirable, and provided a translucent mirror is suitable, a translucent reflecting mirror may be substituted into the camera. In this case an additional lever may be provided to restrain the mirror from retracting when the shutter release is depressed.

Figure 3:
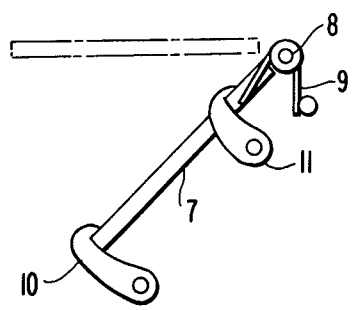
FIG. 3 illustrates the mechanism which is useful for retaining a translucent mirror in place after shutter release.

One example of a construction for making the reflecting mirror inoperative will now be described with reference to FIG. 3. Indicated at reference numeral 7 is a holding plate, which is made rotatable about a shaft 8 for holding the reflecting mirror and which is biased at all times by the action of a spring 9 in the direction to move to an elevated (or retracted) position. A retaining pawl 10 is released by the shutter release operation so that the reflecting mirror is elevated to accomplish the film exposure operation. Upon the film winding operation for the subsequent photography, the holding plate 7 is lowered to its returned position (or observing position) by a variety of known methods and is retained by the action of the retaining pawl 10. When the translucent mirror is used, on the other hand, the holding plate 7 is retained by the action of a stopper pawl 11. This stopper pawl 11 can be brought, when necessary, to the retaining position by outside controls.

Thus, the operating shock can be reduced by changing the reflecting mirror into a translucent mirror when necessary. This also achieves a speed-up of the photography operation due to the reduction in the drive load, and the take-up operation can be accomplished with a reduced force because the charging operation of the driving spring of the reflecting mirror is made unnecessary, and the reflecting mirror can be protected when in the drive operation using a high-speed motor.

Also, for some special cases, such as when using a super-wide angle lens having a remarkably short back focus, the mirror can be removed without replacement. In such case it is sufficient to provide an outside finder system.

Figure 4:
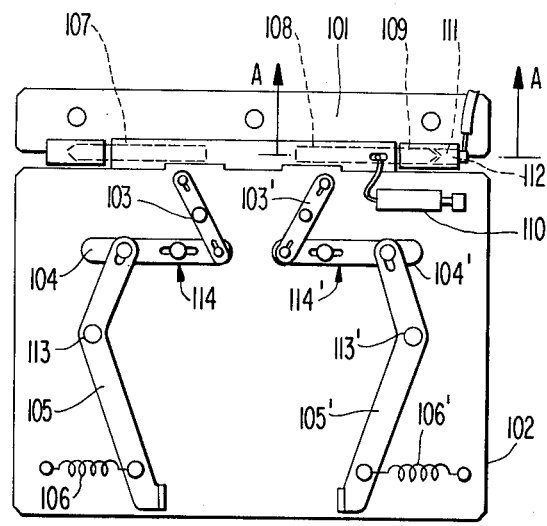
FIG. 4 is a rear view of a removeable mirror sheet.
Figure 5:
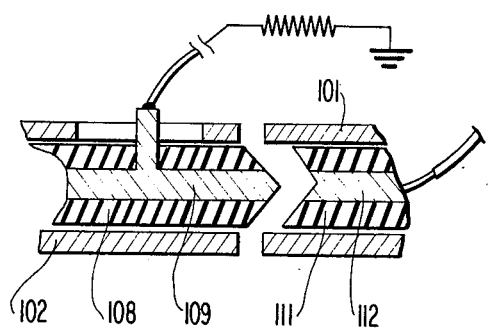
FIG. 5 is a cross sectional view taken along line A—A of FIG. 4.

On example of a removeable mirror sheet, on which a mirror is mounted, is shown in FIGS. 4 and 5. The mirror sheet 102 may have clamp means on the other side for holding different mirrors or each mirror of the multiple mirror SLR system may have its own permanently or semi-permanently attached mirror sheet 102. The mirror sheet 102 is removeably mounted on a fixed hinge 101 by means of retractable pins 107 and 108. The head of each pin fits into a conical opening in a complimentary member fixed to hinge 101 (see FIG. 5).

Separate, but identical mechanisms are provided for releasing the pins 107, 108, so that the mirror sheet may be removed. When levers 105, 105' are pressed inwardly against the biasing force of springs 106, 106', they rotate about fixed pins 113, 113'. Levers 104, 104' are thus moved outwardly, sliding on the pin and slot arrangement 114, 114', to pull the bottom parts of levers 103, 103' outwardly. The upper parts of levers 103, 103' are forced inwardly and they carry the pins 107, 108 with them.

The mirror sheet may also serve as part of the electrical circuit for operating the mechanism that retracts and replaces the mirror. Thus, the inner part 109 of each pin and 112 of the pin complementary member are constructed of metal surrounded by insulating material 111. A resister 110 is connected to the metal part of pin 108. The other end of the resister is connected to ground through the mirror sheet. The part 112 is connected to the control circuitry.

In another photographic operation, a concave mirror may be used as the reflecting mirror so as to shorten the focal distance, thus bringing the focusing plate closer to the mirror. Since the concave mirror is retracted upon photography only the image observed by the operator is made smaller. If, therefore, a focusing plate, having the same size as one for use with a plane mirror is used, the field of view will be enlarged within the image circle of the photographing lens system. This is especially useful for sport photography, because the operator can view a field which is larger than that focused onto the film, and can anticipate when the action will move into the field of the picture frame. If, on the other hand, it is not necessary to enlarge the field of view, the focusing plate and the pentagonal prism can be made so small as to provide a light and miniature single lens reflex camera. The SLR camera system according to the present invention may also include a convex mirror, used to enlarge the composed focal distance combined with that of the photographing lens system. With such a mirror the focusing plate would be moved apart from the convex mirror an accordingly enlarged distance.

In this case, the observable image is enlarged independently of the actually photographed image, thus improving the precision in the focusing operation.

As seen from the above examples, the contradictory requirements of the image size and the size of the field of view can be satisfied without compromise in accordance with the object to be achieved and the photographing conditions, partly by interchanging the reflecting mirror and partly by altering the position of the focusing plate. In photography using invisible rays, such as infrared or untraviolet rays, the reflecting mirror can be replaced by one which has reflecting characteristics for invisible rays. At the same time, the position occupied by the focusing plate is accordingly shifted a distance corresponding to a small difference between the invisible rays and the visible rays so that the angular field obtained on photographing by invisible rays can be adjusted. Moreover, the focusing operation can be also be accomplished without requiring the so-called "red mark registration" which is necessary for the conventional photographing lens system. The description of the position change of the focusing plate is omitted here because it is only a change of an abutment surface in a known changing system.

When a special film, for example, an ultraviolet film, an infrared film or an X-ray film is used, the conventional camera of the internal photometric type cannot accomplish its photometric operation. This is because the photometric system is designed for ordinary light. Thus, these invisible rays are not subject to the photometric operation but are cut off. In a systematized single lens reflex camera, however, a lens system for such special photography is incorporated, and it is desired to accomplish the photometric operation. Since, however, those invisible rays are required, on one hand, for photometry and are harmful on the other hand, something should be selected for satisfying those photometric conditions. This cam be made with ease in the camera according to the present invention by changing the reflrecting mirror into one which has a different spectroscopy factor. For the normal visible ray film, moreover, the correct photometry can be accomplished by changing the spectroscopic reflection factor in accordance with its sensitivity.

The reflecting mirror has different spectroscopic reflection factor for different materials and coatings of its reflecting surface. Especially in the multilayer coating, it is possible to fabricate a reflecting mirror having a variety of spectroscopic reflection factors.

Since the ultraviolet rays or the like are harmful to the eyes of an observer, these rays can be cut off for a single lens reflex camera which requires no photometry or which uses the photometric optical system other than the rays reflected by the reflecting mirror.

The above advantages can also be obtained by the spectroscopic transmissivity of the focusing plate or the like. In the case, however, where the reflecting mirror is used as in the camera according to the present invention, another prominent advantage can be obtained. This additional advantage is that the focusing plate is partially deformed or degraded by the heat which is generated at the focal point when a very hot object such as the sun or a blast furnace is to be photographed. The heat becomes serious especially in the observatory frame because it is irradiated for a prolonged time period, but the light rays in the infrared region can be cut off by the reflecting mirror so that the focusing plate or the like can be protected sufficiently.

Although, moreover, there has been known in the art a variety of single lens reflex cameras of the internal photometric type, in which the reflecting mirror is partially or wholly formed with a translucent portion and in which the photometric operation is carried out with the use of the rays having passed through the translucent portion, there are still several problems with such systems, such as darkness or shadiness in the finder optical in accordance with the ratio of transmission to reflection of the translucent portion (which is called "translucent ratio"), and the shape and area of the translucent portion. Several selections can be made by changing the ratio of transmission to reflection, by brightening the observatory optical system, by increasing reflection, and by widening the cooperating range of photometry by increasing transmission.

It is possible to fabricate a reflecting mirror, which has obscure boundaries to the translucent portion, by partially coating a transparent body with a reflecting material to form a coated portion (or reflecting portion) and a non-coated portion (or transmitting portion), by freely changing the translucency in accordance with the area ratio, and by continuously changing the translucency.

Degradation of appearance can be reduced by selectively using the coating shape (such as longitudinal or transverse stripes, or concentric circules) which is not apparent, in accordance with the object. Since, on the other hand, the translucent portion is a mask for the photometric optical system, it can be used for narrowed (or spotted) photometry, if it is minimized, and for centralized or mean photography if it is enlarged.

By making such reflecting mirrors interchangeable, it is possible to obtain a single lens reflex camera which can indicate the photometric range through brightness, which has a clear observable frame, which has a changeable angle of photometry.

Generally speaking, since a reflecting mirror is only one optical system which is interposed directly between the photographing lens system and the film surface so as to form a branch point for branching the observing optical path from the photographing optical path, excessively various and high advantages can be obtained by interchanging such reflecting mirrors. According to the present invention, as has been described hereinbefore, there is provided a single lens reflex camera which can cope with the mirro-shortage problem by the mirror changing process even for a tele-photo lens having an excessively long focal distance, which can minimize the shock resulting from the mirror operation, which can obtain a variety of protections for enlargement of ratio of the field of view and the image and the compensations of spectroscopic sensitivity, and which can accomplish various photometric operations.

What is claimed is:

1. A single lens reflex camera system of the type having a camera body and multiple interchangeable lens systems for selective attachment to said camera body to accomplish different photography objectives, and a finder optical system receiving light having passed through the selected lens system and reflected towards said finder optical system by reflecting mirror means, said reflex camera system further including means active upon depression of a shutter release button to swing the mirror means away from the path of optical rays passing through said selected lens system, the improvement characterized by a set of individually removeable mirrors for selective placement in said camera body as the reflecting mirror means, said individual mirrors being different that one another to accomplish different photography objectives.

2. A single lens reflex camera as claimed in claim 1 wherein said mirror means comprises, a hinge member fixed to said camera body, a fixed mirror sheet removeably and pivotally mounted on said hinge member by means of spring biased retractable pins, each pin including an electrically conductive metal part mating with an electrically conductive metal part of said hinge member to complete an electrical circuit when said sheet is attached to said hinge member.

3. A single lens reflex camera system as claimed in claim 2 further comprising lever means, independent of said shutter release button, for holding said mirror means in the path of said optical rays after depression of said shutter release button, said lever means being adapted for use with a mirror of said set of mirrors which is translucent.

4. A single lens reflex camera system as claimed in claim 3 wherein said set of mirrors includes, a first plane reflecting mirror having a length short enough to avoid contact with a super-wide angle lens of said multiple interchangeable lens systems, a second plane reflecting mirror having a length larger than said first plane reflecting mirror and suitable for preventing mirror shortage phenomenum when used with a telephoto lens system, a partially transparent partially reflecting mirror, a convex mirror, and a concave mirror.

* * * * *